United States Patent
Do et al.

(10) Patent No.: US 9,876,400 B2
(45) Date of Patent: Jan. 23, 2018

(54) ROTOR OF WOUND ROTOR SYNCHRONOUS MOTOR

(71) Applicant: Hyundai Motor Company, Seoul (KR)

(72) Inventors: Sanghwa Do, Gyeonggi-do (KR);
Sanghoon Moon, Gyeonggi-do (KR);
Jung Shik Kim, Seoul (KR);
Woongchan Chae, Gyeonggi-do (KR);
Yongsung Jang, Gyeonggi-do (KR);
Sangjin Park, Gyeonggi-do (KR);
Hyoungjun Cho, Seoul (KR);
Kyoungbum Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 310 days.

(21) Appl. No.: 14/747,724

(22) Filed: Jun. 23, 2015

(65) Prior Publication Data

US 2016/0149445 A1 May 26, 2016

(30) Foreign Application Priority Data

Nov. 24, 2014 (KR) .................. 10-2014-0164778

(51) Int. Cl.
*H02K 1/24* (2006.01)
*H02K 29/03* (2006.01)

(52) U.S. Cl.
CPC ............... *H02K 1/24* (2013.01); *H02K 29/03* (2013.01); *H02K 2213/03* (2013.01)

(58) Field of Classification Search
CPC .. H02K 1/24; H02K 1/14; H02K 1/16; H02K 3/487
See application file for complete search history.

(56) References Cited

U.S. PATENT DOCUMENTS

| 4,099,104 A | * | 7/1978 | Muller | H02K 29/08 318/400.23 |
| 4,280,072 A | * | 7/1981 | Gotou | H02K 1/08 310/156.26 |
| 4,398,134 A | * | 8/1983 | Muller | H02K 29/08 318/400.23 |
| 4,429,263 A | * | 1/1984 | Muller | H02K 29/08 310/68 R |
| 4,730,136 A | * | 3/1988 | Muller | H02K 29/08 310/156.21 |

(Continued)

FOREIGN PATENT DOCUMENTS

| JP | 10-285839 A | 10/1998 |
| JP | 2005-341688 A | 12/2005 |

(Continued)

*Primary Examiner* — Robert W Horn
(74) *Attorney, Agent, or Firm* — Mintz Levin Cohn Ferris Glovsky and Popeo, P.C.; Peter F. Corless

(57) ABSTRACT

A rotor of a wound rotor synchronous motor is spaced apart from an interior diameter surface of a stator by a predetermined gap, and includes a plurality of teeth wound by a rotor coil, and circumferentially spaced apart from each other by a distance, where a slot is formed between the teeth, each tooth is formed with a shoe facing an interior diameter surface of the stator, and both ends of the shoe protrude in a direction of both ends of an adjacent shoe, where each tooth includes a first part corresponding to a winding body of the tooth and a second part extending in the direction of both ends of the adjacent shoe from both sides of the first part.

5 Claims, 4 Drawing Sheets

(56) References Cited

U.S. PATENT DOCUMENTS

| | | | | |
|---|---|---|---|---|
| 4,881,002 A * | 11/1989 | Yamaguchi | ............ | H02K 23/42 310/111 |
| 5,172,020 A * | 12/1992 | Hibino | ................... | H02K 1/02 310/216.016 |
| 6,376,963 B1 * | 4/2002 | Furuya | ............... | H02K 15/0018 310/214 |
| 6,407,473 B1 * | 6/2002 | Horng | ................... | F04D 25/08 310/164 |
| 6,624,541 B2 * | 9/2003 | Horng | ................... | H02K 1/148 310/216.045 |
| 6,756,718 B2 * | 6/2004 | Lee | ...................... | H02K 1/187 29/596 |
| 7,339,301 B2 * | 3/2008 | Chen | ................... | H02K 29/03 310/216.012 |
| 7,579,745 B2 * | 8/2009 | Yamada | ................. | H02K 23/04 29/596 |
| 8,258,671 B2 * | 9/2012 | Hatch | ...................... | H02K 1/24 29/596 |
| 8,334,627 B2 * | 12/2012 | Koyanagi | ............ | H02K 1/2786 310/154.31 |
| 9,484,774 B2 * | 11/2016 | Omura | ...................... | H02K 1/14 |
| 2013/0300249 A1 | 11/2013 | Omura et al. | | |
| 2015/0042199 A1 * | 2/2015 | Iwata | ...................... | H02K 1/148 310/216.009 |
| 2016/0149445 A1 * | 5/2016 | Do | ........................... | H02K 1/24 310/214 |
| 2016/0294241 A1 * | 10/2016 | Jang | ...................... | H02K 3/345 |

FOREIGN PATENT DOCUMENTS

| | | |
|---|---|---|
| JP | 2007-209186 A | 8/2007 |
| JP | 2010-011706 A | 1/2010 |
| JP | 2011-229212 A | 11/2011 |
| JP | 2014-103730 A | 6/2014 |
| JP | 2014-110760 A | 6/2014 |
| KR | 10-2005-0083474 A | 8/2005 |

* cited by examiner

ROTOR OF WOUND ROTOR SYNCHRONOUS MOTOR

CROSS-REFERENCE TO RELATED APPLICATION

This application claims under 35 U.S.C. § 119(a) the benefit of Korean Patent Application No. 10-2014-0164778 filed in the Korean Intellectual Property Office on Nov. 24, 2014, the entire contents of which are incorporated herein by reference.

BACKGROUND (a) Technical Field

The present invention relates to a wound rotor synchronous motor, more particularly, to a rotor structure of a wound rotor synchronous motor capable of reducing torque ripple while ensuring mechanical strength due to centrifugal force of a rotor coil.

(b) Description of the Related Art

In general, a hybrid vehicle or an electric vehicle may generate a driving torque by an electric motor (hereinafter referred to as "drive motor") which obtains a driving torque from electrical energy.

For example, a hybrid vehicle can be driven in an electric vehicle (EV) mode, which is a pure electric vehicle mode using only power of a drive motor, or in a hybrid electric vehicle (HEV) mode using both torque of an engine and torque of the drive motor as power. Generally, an electric vehicle is driven using torque of the drive motor as the power source.

In particular, the drive motor, which is used as a power source of an environmentally friendly vehicle, generally uses a permanent magnet synchronous motor (PMSM). The PMSM maximizes the performance of a permanent magnet in a limited layout condition.

In the above permanent magnet, neodymium (Nd) improves intensity of a permanent magnet, and dysprosium (Dy) improves high temperature demagnetization resistance. However, rare earth metals Nd and Dy embedded in the permanent magnet are limited to some of countries, such as China, and Nd and Dy are very expensive and have large price fluctuations.

In order to address the above-mentioned problems, an induction motor for a hybrid vehicle has been developed. However, in order to represent the same motor performance, the induction motor undesirably has an increased volume and weight.

Meanwhile, in recent years, as a drive motor serving as a power source of an environmentally friendly vehicle, a wound rotor synchronous motor (hereinafter referred to as "WRSM") has been developed to replace a permanent magnet synchronous motor (PMSM).

In a state that a coil is wound around a rotor as well as a stator, if a current is applied to the WRSM, the rotor is electromagnetized so that a permanent magnet of a permanent magnet synchronous motor (PMSM) may be replaced with the WRSM.

In the WRSM, a rotor is spaced apart from an inner side of a stator by a predetermined gap. If power is applied to a coil of the stator and a coil of the rotor, a magnetic field is formed. The rotor is rotated by magnetic attraction generated between the coil of the stator and the coil of the rotor.

Unlike the permanent magnet synchronous motor, since the coil is wound around the rotor in a WRSM, great centrifugal force is applied to the coil of the rotor upon high speed rotation (generally a maximum of 10,000 rpm or greater in a case of an EV).

Accordingly, in the WRSM, upon high speed rotation of the rotor, ordering of the coil of the rotor may be deteriorated due to the centrifugal force applied to the coil of the rotor, and stress is concentrated to a rotor tooth winding the coil of the rotor so that the rotor tooth may be broken.

Meanwhile, torque is a parameter to determine the performance of the WRSM. Since torque ripple is closely related to vibration noise, the torque ripple may be very important. The torque and the torque ripple may be determined according to shapes of a stator and a rotor, and a winding fill factor and a current of a coil.

In the meantime, the performance may be determined according to a shape of teeth winding the rotor coil. If an end of the teeth is short, a magnetic flux is concentrated thus ensuring the torque is advantageous, but torque ripple is increased. Upon high speed rotation of the rotor, it is difficult to ensure mechanical strength for supporting centrifugal force of the stator coil.

Accordingly, in the conventional art, a wedge is inserted between teeth so that mechanical strength for supporting a centrifugal force of the rotor coil is ensured, but the number of components is increased.

Further, in the conventional art, there is a method of distributing the centrifugal force applied to the rotor coil by increasing a contact area of the rotor coil by increasing lengths of ends of teeth. However, such an approach deteriorates the torque performance.

The above information disclosed in this Background section is only for enhancement of understanding of the background of the invention and therefore it may contain information that does not form the prior art that is already known in this country to a person of ordinary skill in the art.

SUMMARY

The present invention provides a rotor of a wound rotor synchronous motor (WRSM) having advantages of distributing centrifugal force applied to a rotor coil while maintaining torque performance at the same level by improving a tooth structure, reducing torque ripple while ensuring mechanical strength, and increasing a winding fill factor. An exemplary embodiment of the present invention provides a rotor spaced apart from an interior diameter surface of a stator by a predetermined gap in a wound rotor synchronous motor, the rotor including a plurality of teeth wound by a rotor coil, and circumferentially spaced apart from each other by a predetermined distance, wherein a slot is formed between the teeth, each tooth is formed therein with a shoe facing an interior diameter surface of the stator, and both ends of the shoe protrude in a direction of both ends of an adjacent shoe, the tooth including a first part corresponding to a winding body of the tooth and a second part extending in the direction of both ends of the adjacent shoe from both sides of the first part, and the first and second parts form first and second arcs having different curvature radii, respectively.

The second part may be configured by a support structure for supporting centrifugal force applied to the rotor coil in the slot.

The second arc of the second part may have a larger curvature radius than a curvature radius of the first arc of the first part.

A gap between the interior diameter surface of the stator and the first arc may differ from a gap between the interior diameter surface of the stator and the second arc.

The gap between the first arc and the interior diameter surface of the stator may be changed in a direction of the first arc.

The gap between the first arc and the interior diameter surface of the stator may be gradually increased to both sides of the first arc from a center of the first arc.

The gap between the second arc and the interior diameter surface of the stator may be larger than the gap between the first arc and the interior diameter surface of the stator.

The gap between the second arc and the interior diameter surface of the stator may be uniform along a curvature radius of the second arc.

According to the present invention, a wound rotor synchronous motor includes: a stator; and a rotor spaced apart from an interior diameter surface of the stator by a predetermined gap, where the rotor includes: a plurality of teeth wound by a rotor coil, and circumferentially spaced apart from each other by a predetermined distance, and a slot formed between the teeth, each tooth being formed with a shoe facing an interior diameter surface of the stator, and both ends of the shoe protruding in a direction of both ends of an adjacent shoe, where each tooth includes a first part corresponding to a winding body of the tooth and a second part extending in the direction of both ends of the adjacent shoe from both sides of the first part, the first and second parts form first and second arcs having different curvature radii, respectively

DETAILED DESCRIPTION OF THE EMBODIMENTS

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Figure 1:
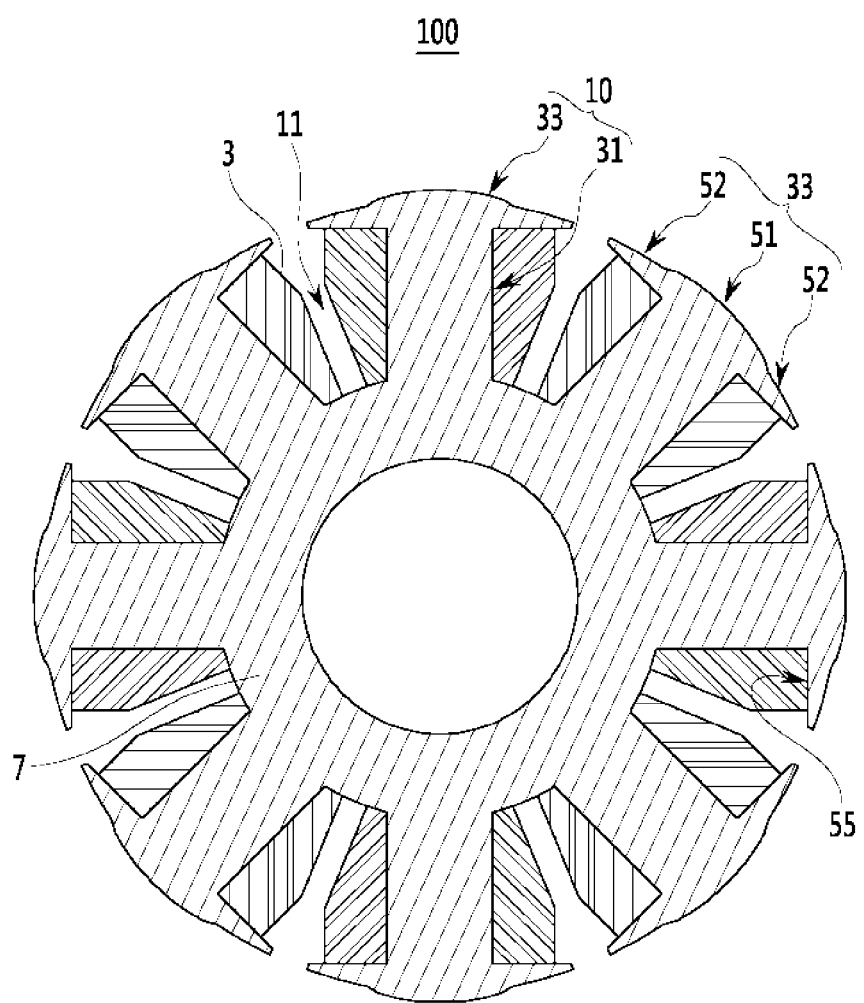
FIG. 1 is a view illustrating a rotor of a wound rotor synchronous motor (WRSM) according to an exemplary embodiment of the present invention.

FIG. 1 is a view illustrating a rotor of a wound rotor synchronous motor (WRSM) according to an exemplary embodiment of the present invention.

Referring to FIG. 1, the exemplary embodiment of the present invention is applied to the WRSM. The WRSM is applicable to a drive motor for a hybrid vehicle to obtain driving torque by electrical energy in the environmentally friendly vehicle. For example, the WRSM according to the exemplary embodiment of the present invention includes a stator 1 wound with a stator coil (not shown), and a rotor 100 wound with a rotor coil 3 and disposed at an inner side of the stator 1.

In this case, the rotor 100 according to an exemplary embodiment of the present invention includes a rotor core 7 in which a plurality of steel plates are laminated. An interior diameter surface of the rotor core 7 is coupled with a rotation shaft (not shown), and an outer surface of the rotor core 7 is disposed at an inner side of the stator 1 to be spaced apart from the interior diameter surface of the stator 1 by a predetermined gap.

Accordingly, in a state that the rotor coil 3 is wound around the rotor 100 as well as the stator 1, if a current is applied to the WRSM, the rotor is electromagnetized so that driving torque may be generated due to attraction force and repulsive force of electromagnetism between an electromagnet of the rotor 100 and an electromagnet of the stator 1.

Further, the WRSM applied to the exemplary embodiment of the present invention is used to drive the vehicle, and uses a rotor structure of 8 poles or more in order to increase output density.

The rotor 100 of the WRSM according to the exemplary embodiment of the present invention to be described below has a structure capable of maintaining torque performance of the motor at the same level and distributing centrifugal force applied to a rotor coil 3 by improving a tooth structure for winding the rotor coil 3.

In particular, the exemplary embodiment of the present invention provides a rotor 100 of a wound rotor synchronous motor (WRSM) which may reduce torque ripple while ensuring mechanical strength with centrifugal force applied to the rotor coil 3, and increase a winding fill factor of the rotor coil 3.

Figure 2:
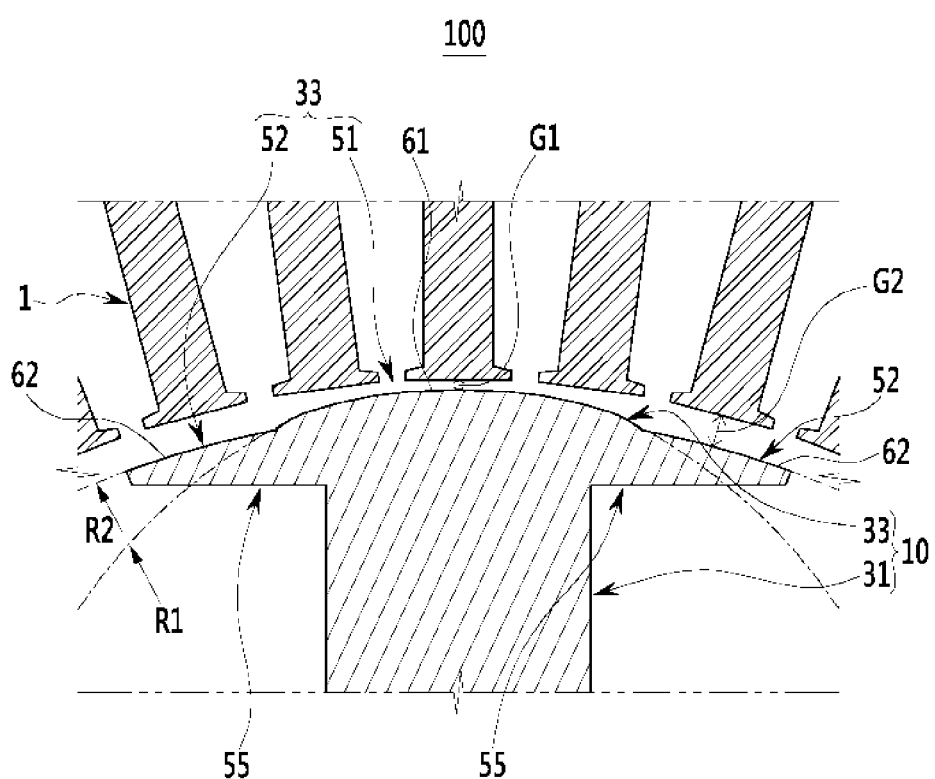
FIG. 2 is an enlarged view illustrating a tooth structure applied to the rotor of the WRSM according to the exemplary embodiment of the present invention.

FIG. 2 is an enlarged view illustrating a tooth structure applied to the rotor of the WRSM according to the exemplary embodiment of the present invention.

Referring to FIGS. 1 and 2, a stator coil 3 is wound around the rotor 100 of the WRSM according to the exemplary embodiment of the present invention, and the rotor 100 includes a plurality of teeth 10 which are circumferentially spaced apart from each other.

A slot 11 for winding the rotor coil 3 around a tooth 10 is formed between the teeth 10.

In particular, the teeth 10 are circumferentially spaced apart from each other by a predetermined distance in the rotor core 7 while interposing the slot 11 therebetween.

In this case, an insulation resin (not shown) for insulating the rotor coil 3 wound around the teeth 10 may be molded at the slot 11 between the teeth 10.

In an exemplary embodiment of the present invention, each tooth 10 includes a coil winding part 31 wound with the rotor coil 3, and a rotor shoe 33 integrally formed on the coil winding part 31.

The coil winding part 31 is configured by a coil winding body having a square section shape, and the rotor shoe 33 forms an outer wheel part facing an interior diameter surface of the stator 1 to be spaced apart from an interior diameter surface of the stator 1 by a predetermined gap.

In this case, both ends of the rotor shoe 33 protrude to both ends of adjacent teeth 10. In particular, the rotor shoe 33 may be formed so that both sides thereof (right and left sides as shown in FIG. 2) are symmetrically formed based on a center of the tooth 10, that is, a connected center line based on a rotation center point of the rotor 100.

In this case, as described above, since both ends of the rotor shoe 33 protrude to both ends of an adjacent rotor shoe 33, in an exemplary embodiment of the present invention, the adjacent rotor shoes 33 may form a relatively narrow gap that is sufficient to wind the stator coil 5 around the coil winding part 31 of the tooth 10.

The rotor shoe 33 according to an exemplary embodiment of the present invention includes a first part 51 corresponding to the coil winding part 31, and second parts 52 extending towards both ends of adjacent rotor shoes 33 from both sides of the first part 51.

The first part 51 is formed at a top end of the coil winding part 31 in the drawing, and the second parts 52 protrude toward adjacent rotor shoes 33 from both sides of the first part 51. That is, the second part 52 of the rotor shoe 33 in adjacent teeth 10 may form a relatively narrow gap that is sufficient to wind the rotor coil 3 around the coil winding part 31.

In this case, the first and second parts 51 and 52 are configured as an outer wheel part facing an interior diameter surface of the stator 1 by a predetermined gap, and the second part 52 may be configured by a support structure 55 to support the rotor coil 3 wound around the coil winding part 31. That is, the second part 52 may support centrifugal force applied to the rotor coil 3 wound around the coil winding part 31.

Meanwhile, in an exemplary embodiment of the present invention, the first and second parts 51 and 52 form first and second arcs 61 and 62 having different curvature radii R1 and R2, respectively. For example, the curvature radius R2 of the second arc 62 may be greater than a curvature radius R1 of the first arc 61.

Further, an exemplary embodiment of the present invention, A gap G1 between an interior diameter of the stator 1 and the first arc 61 differs from a gap G2 between the interior diameter of the stator 1 and the second arc 62. For example, the gap G2 between the second arc 62 and the interior diameter surface of the stator 1 may be greater than the gap G1 between the first arc 61 and the interior diameter surface of the stator 1.

In this case, the gap G1 between the first arc 61 and the interior diameter surface of the stator 1 is changed in a direction of the first arc 61. For example, the gap G1 between the first arc 61 and the interior diameter surface of the stator 1 is gradually increased to both sides of the first arc 61 from a center of the first arc 61.

Further, the gap G2 between the second arc 62 and the interior diameter surface of the stator 1 may be uniform in a curvature radius R2 of the second arc 62.

Hereinafter, an operational effect of the rotor of the WRSM according to an exemplary embodiment of the present invention will be described by comparing with first and second comparative examples.

Figure 3:
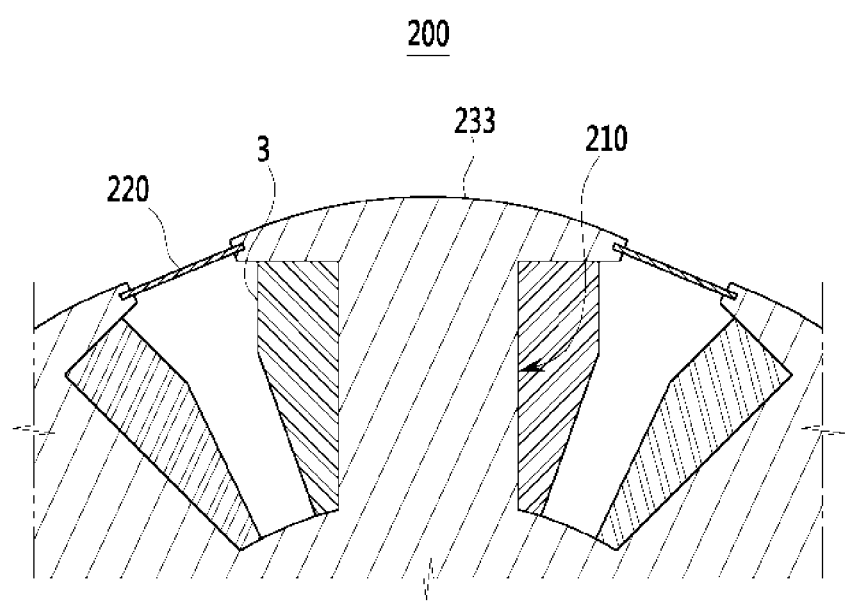
FIG. 3 is a view illustrating a first comparative example for describing an operational effect of the WRSM according to the exemplary embodiment of the present invention.

FIG. 3 is a view illustrating a first comparative example for describing an operational effect of a WRSM according to an exemplary embodiment of the present invention.

Referring to FIG. 3, a rotor 200 of a first comparative example according to an exemplary embodiment of the present invention has a structure where a gap between adjacent rotor shoes 233 of a tooth 210 is relatively narrow, that is, both ends of the adjacent rotor shoes 233 are short.

Since both ends of the adjacent rotor shoes 233 are relatively short in the first comparative example, magnetic flux is concentrated to be advantageous to ensure torque. However, upon high speed rotation of the rotor 200, it is difficult to ensure mechanical strength for supporting centrifugal force applied to the rotor coil 3 so that torque ripple may be relatively increased.

Accordingly, in the first comparative example, upon the high speed rotation, in order to support the centrifugal force applied to the rotor coil 3, a wedge 220 is installed between the teeth 210.

However, in an exemplary embodiment of the present invention, a second part 52 of the rotor shoe 33 extends to the second part 52 side of the adjacent rotor shoe 33, and the second part 52 may configure the support structure 55 while making the gap between the adjacent rotor shoes 33 narrow.

Accordingly, in an exemplary embodiment of the present invention, since the rotor coil 3 wound around the coil winding part 31 of the tooth 10 may be firmly supported through the second part 52 of the rotor shoe 33, the centrifugal force applied to the rotor coil 3 is distributed upon the high speed rotation of the rotor 100 and the mechanical strength of the rotor 100 may be further increased.

Further, in an exemplary embodiment of the present invention, since the second part 52 of the rotor shoe 33 is configured by the support structure 55 for supporting the rotor coil 3, a separate wedge 22 as in the first comparative example is not used so that the entire number of components of the motor may be reduced while ensuring stable mechanical strength, and a manufacturing cost may be reduced.

In addition, in an exemplary embodiment of the present invention, as the second part 52 of the rotor shoe 33 extends to a second part 52 side of the adjacent rotor shoe 33, a contact area of a rotor coil 3 wound around the coil winding part 31 of the tooth 10 is increased so that a coil fill factor may be increased, and heat generation of the rotor coil 3 may be reduced, resulting in improving the performance and maximum output of the motor.

Figure 4:
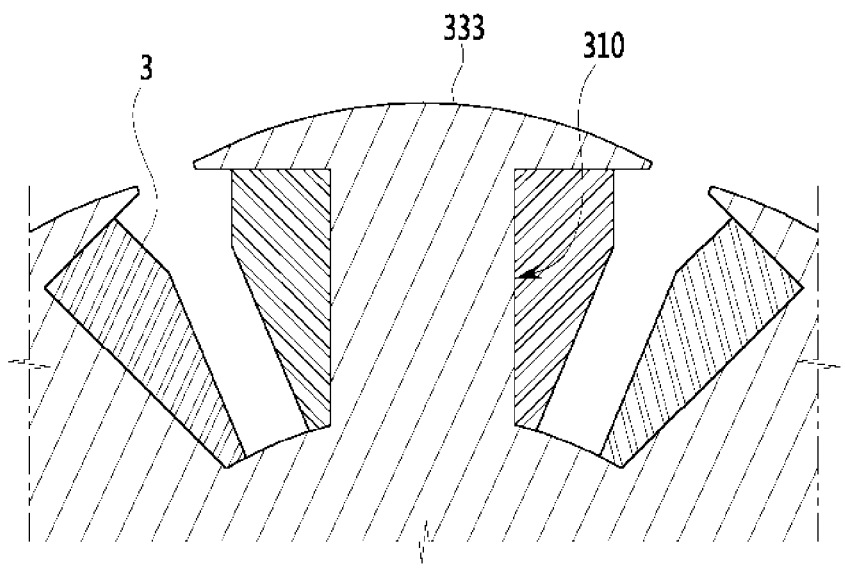
FIG. 4 is a view illustrating a second comparative example for describing an operational effect of the WRSM according to the exemplary embodiment of the present invention.

FIG. 4 is a view illustrating a second comparative example for describing an operational effect of a WRSM according to an exemplary embodiment of the present invention.

Referring to FIG. 4, a rotor 300 of a second comparative example according to an exemplary embodiment of the present invention has a structure where a gap between adjacent rotor shoes 333 of teeth 310 is relatively narrow, that is, both ends of the adjacent rotor shoes 233 are long.

Since both ends of the adjacent rotor shoes 233 are relatively long in the second comparative example, a winding fill factor of the rotor coil 3 may be increased but the torque performance may be reduced and magnetic resistance may be changed, and torque ripple may be increased according to a relative position between the stator (not shown) and the rotor 300.

However, in an exemplary embodiment of the present invention, since the first and second parts 51 and 52 of the rotor shoe 33 form first and second arcs 61 and 62 having different curvature radii R1 and R2, respectively, and the gap G1 between the interior diameter surface of the stator 1 and the first arc 61 differs from the gap G2 between the interior diameter surface of the stator 1 and the second arc 62, a gap length between the interior diameter surface of the stator 1 and the rotor shoe 33 may be adjusted upon the high speed rotation of the rotor 100.

Accordingly, in an exemplary embodiment of the present invention, upon the high speed rotation of the rotor 100, since the centrifugal force applied to the rotor coil 3 is distributed upon the high speed rotation, and a gap length between the interior diameter surface of the rotor 1 and the rotor shoe 33 may be adjusted, the torque ripple may be reduced while minimizing a change rate of magnetic resistance which is changed according to a relative position between the stator 1 and the rotor 100.

Meanwhile, the comparison of the performance of the rotor 100 of a WRSM according to an exemplary embodiment of the present invention with the WRSMs using rotors 200 and 330 according to the first and second comparative example is listed in a following Table 1.

TABLE 1

| Classification | Coil contact area (mm$^2$) | Average torque (Nm) | Torque ripple (%) |
|---|---|---|---|
| First comparative example | 1521 | 277.8 | 3.7 |
| Second comparative example | 2024 | 274.7 | 3.3 |
| Exemplary embodiment | 2024 | 275.5 | 2.7 |

As listed in the Table 1, a contact cross-section of the rotor coil 3 is increased by 30%, torque ripple is reduced by 28%, and torque is reduced by 0.8% in an exemplary embodiment of the present invention as compared with the first and second comparative examples.

In particular, an exemplary embodiment of the present invention may increase the winding fill factor of a rotor coil 3 to increase the performance and output of the motor while maintaining the torque performance with the same level as that of the first and second comparative examples, and may reduce torque ripple so that vibration and noise characteristics in a motor operation state may be improved.

As mentioned previously, in accordance with the rotor 100 of the WRSM according to the exemplary embodiment of the present invention, the centrifugal force applied to the rotor coil 3 may be distributed while maintaining the torque performance at the same level by improving a structure of the rotor tooth 10 and torque ripple may be reduced while ensuring the mechanical strength, and the winding fill factor with respect to the tooth 10 may be improved.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A rotor spaced apart from an interior diameter surface of a stator by a predetermined gap in a wound rotor synchronous motor, the rotor comprising:
   a plurality of teeth wound by a rotor coil, and circumferentially spaced apart from each other by a predetermined distance,
   wherein a slot is formed between the teeth, each tooth is formed therein with a shoe facing an interior diameter surface of the stator, and both ends of the shoe protrude in a direction of both ends of an adjacent shoe,
   wherein each tooth comprises a first part corresponding to a winding body of the tooth and a second part extending in the direction of both ends of the adjacent shoe from both sides of the first part,
   wherein the first and second parts form first and second arcs having different curvature radii, respectively,
   wherein a gap between the interior diameter surface of the stator and the first arc differs from a gap between the interior diameter surface of the stator and the second arc,
   wherein the gap between the first arc and the interior diameter surface of the stator is gradually increased to both sides of the first arc from a center of the first arc, and
   wherein the gap between the second arc and the interior diameter surface of the stator is uniform along a curvature radius of the second arc.

2. The rotor of claim 1, wherein the second part is configured by a support structure for supporting centrifugal force applied to the rotor coil in the slot.

3. The rotor of claim 1, wherein the second arc of the second part has a larger curvature radius than a curvature radius of the first arc of the first part.

4. The rotor of claim 1, wherein the gap between the second arc and the interior diameter surface of the stator is larger than the gap between the first arc and the interior diameter surface of the stator.

5. A wound rotor synchronous motor, comprising:
   a stator;
   a rotor spaced apart from an interior diameter surface of the stator by a predetermined gap,
   the rotor comprising:
   a plurality of teeth wound by a rotor coil, and circumferentially spaced apart from each other by a predetermined distance, and a slot formed between the teeth, each tooth being formed with a shoe facing an interior diameter surface of the stator, and both ends of the shoe protruding in a direction of both ends of an adjacent shoe,
   wherein each tooth comprises a first part corresponding to a winding body of the tooth and a second part extending in the direction of both ends of the adjacent shoe from both sides of the first part, the first and second parts form first and second arcs having different curvature radii, respectively, wherein a gap between the interior diameter surface of the stator and the first arc differs from a gap between the interior diameter surface of the stator and the second arc, wherein the gap between the first arc and the interior diameter surface of the stator is gradually increased to both sides of the first arc from a center of the first arc, and wherein the gap between the second arc and the interior diameter surface of the stator is uniform along a curvature radius of the second arc.

* * * * *